(12) United States Patent
DeJonge et al.

(10) Patent No.: US 6,196,078 B1
(45) Date of Patent: Mar. 6, 2001

(54) EXTERNAL ELECTRONIC TRANSMISSION SHIFT SYSTEM

(75) Inventors: Robert A. DeJonge, West Olive; Stephen D. Wexall, Grand Haven, both of MI (US)

(73) Assignee: Grand Haven Stamped Products, Grand Haven, MI (US)

( * ) Notice: Subject to any disclaimer, the term of this patent is extended or adjusted under 35 U.S.C. 154(b) by 0 days.

(21) Appl. No.: 09/391,786

(22) Filed: Sep. 8, 1999

Related U.S. Application Data
(60) Provisional application No. 60/115,415, filed on Jan. 11, 1999.

(51) Int. Cl.[7] .................................................. B60K 17/04
(52) U.S. Cl. ......................................................... 74/473.12
(58) Field of Search ........................ 74/336, 335, 473.12, 74/431.1, 348

(56) References Cited

U.S. PATENT DOCUMENTS

| | | | |
|---|---|---|---|
| Re. 34,064 | * 9/1992 | Tury et al. .......................... | 74/335 X |
| 4,567,969 | * 2/1986 | Makita ............................... | 74/473.12 |
| 4,660,440 | * 4/1987 | Matsumura et al. ................ | 74/431.1 |
| 4,790,204 | * 12/1988 | Tury et al. ..................... | 74/473.12 X |
| 4,841,793 | * 6/1989 | Leigh-Monstevens et al. ....... | 74/335 |
| 4,922,769 | * 5/1990 | Tury .................................. | 74/335 X |
| 5,094,126 | * 3/1992 | Stainton et al. .................... | 74/335 X |
| 5,161,422 | * 11/1992 | Suman et al. ........................... | 74/335 |
| 5,653,143 | * 8/1997 | Langevin ............................... | 74/348 |
| 5,828,151 | 10/1998 | Bustamante et al. . | |

* cited by examiner

*Primary Examiner*—Lenard A. Footland
*Assistant Examiner*—Colby Hansen
(74) *Attorney, Agent, or Firm*—Price Heneveld Cooper DeWitt & Litton (57) ABSTRACT

An external electronic shift system is provided that is adapted to electronically shift an existing automatic transmission for a vehicle. The automatic transmission includes gearing movable to a plurality of different gear positions, and further includes an actuator rod connected to the gearing that is rotatable to selectively shift the gearing between the gear positions. A control unit is programmed to receive electrical signals from a shifter and generate signals to control shifting of the transmission. A stepper motor unit is mechanically attached to the actuator rod and electrically connected to the control unit. The stepper motor unit is configured to selectively rotate the actuator rod to shift the transmission in response to the signals received from the control unit. Specifically, the stepper motor unit includes a housing, a first rod rotatably supported on the housing and having an end configured to matingly engage the male end of the actuator rod, a second rod rotatably supported on the housing, intermeshing gears on the first and second rods for providing a first set of angular positions to the first rod based on a second set of angular positions of the second rod, and a stepper motor connected to the second rod for moving the second rod selectively to each one of the second set of angular positions.

15 Claims, 13 Drawing Sheets

Fig. 8  EXAMPLE TORQUE DEVELOPED BY ACTUATOR "A" DRIVING FROM "P" TO "D4"

Fig. 9  EXAMPLE TORQUE DEVELOPED BY ACTUATOR "B" DRIVING FROM "P" TO "D4"

Fig. 10  EXAMPLE TORQUE DEVELOPED BY ACTUATORS "A" AND "B" DRIVING FROM "P" TO "D4"

Fig. 11 TORQUE DEVELOPED BY ACTUATOR "A";
A+ = TORQUE WITH POSITIVE VOLTAGE, CURRENT
A0 = TORQUE WITH ZERO VOLTAGE, CURRENT
A- = TORQUE WITH NEGATIVE VOLTAGE, CURRENT

Fig. 12 TORQUE DEVELOPED BY ACTUATOR "B";
B+ = TORQUE WITH POSITIVE VOLTAGE, CURRENT
B0 = TORQUE WITH ZERO VOLTAGE, CURRENT
B- = TORQUE WITH NEGATIVE VOLTAGE, CURRENT

EXTERNAL ELECTRONIC TRANSMISSION SHIFT SYSTEM

This application claim benefit to Provisional Application Ser. No. 60/115,415 filed Jan. 11, 1999.

BACKGROUND OF THE INVENTION

The present invention relates to a shift system adapted to shift an automatic transmission of a passenger vehicle, and more particularly relates to an electronic modular unit adapted to attach to a casing of an existing transmission and that is adapted to shift the transmission based on electronic inputs.

Traditional automatic transmissions for passenger vehicles include an actuator rod or "D rod" that extends from the transmission and that can be rotated to different angular positions to shift the transmission between gear positions, such as park, reverse, neutral, and drive. Historically, the actuator rod is controlled by manually manipulating a shifter in the passenger compartment of the vehicle, with the shifter being operably connected to the actuator rod by a mechanical linkage, such as a telescoping Bowden cable or a rigid rod. Many vehicle manufacturers desire to change from the mechanical linkage to an electronically controlled shifting arrangement. One reason is to eliminate assembly problems associated with routing and connecting a stiff Bowden cable or rigid linkage between the shifter and the transmission. Another reason is to take advantage of wiring, which is easier to route and connect, requires less space, is more flexible, and is more forgiving of product variation. Also, wiring does not require a large passageway through the vehicle floor pan or firewall, thus reducing the noise and environmental problems (e.g., corrosion, water leaks, etc.) associated with large passageways through or holes in the floor pan or firewall. Also, more and more manufacturers are incorporating electrical components and electronically controlled systems into vehicles in order to take advantage of advancements in electronics for improved vehicle control, in order to meet customer demands and in order to achieve cost savings.

Despite the advantages of an electronic shifting system, another problem is that manufacturers have already made large investments in existing transmission designs and in the related tooling, fixturing, and manufacturing operations. It would require substantial lead time and huge new capital investments in order to redesign, tool up, and begin producing transmissions that are adapted to be shifted entirely and solely by an electronic signal. Thus, a system that is retrofittable and/or useable on or with existing transmissions is desired.

At least one manufacturer is considering using a DC motor attached to the actuator rod of an existing transmission to selectively rotate the actuator rod between gear positions. However, there are problems and disadvantages associated with using a DC motor in the harsh environment under a vehicle, since DC motors are not well suited for harsh environments since DC motors tend to be relatively complex and high warranty. For example, DC motors include brushes and rotating armature windings. Further, DC motors tend to be heavier and larger than desired, which can be problematic given today's stringent gas mileage requirements for vehicles. Further, space is always a problem, particularly with front wheel drive vehicles where both the motor and the transmission are located at a front of the vehicle. Another problem with DC motors is their relatively slow response time, their low torque per unit weight, and their relatively high current usage and requirements. Further, DC motors require a separate detent to hold them in a selected position after being moved, which results in extra parts and a more complicated assembly.

In addition to the above, vehicle manufactures are considering replacing traditional hand-operated shift levers, and instead using different driver interface modules (e.g. pushbuttons, miniaturized control levers or joysticks, and the like) for receiving driver inputs to control shifting transmissions. It is important that whatever interface module is used, the shifting system must be able to incorporate the same.

Accordingly, a simplified yet durable electronic shifting system for shifting existing transmissions is desired that solves the aforementioned problems and that has the aforementioned advantages.

SUMMARY OF THE INVENTION

In one aspect of the present invention, an apparatus includes an automatic transmission for a vehicle. The automatic transmission includes gearing movable to a plurality of different gear positions, and further includes an actuator rod operably coupled to the gearing and rotatable to selectively shift the gearing between the gear positions. A driver interface module is provided and a control unit is operably connected to the driver interface module that is programmed to generate signals to control shifting of the transmission based on inputs from the driver interface module. A stepper motor unit is mechanically attached to the actuator rod and electrically operably connected to the control unit, with the stepper motor unit being configured to selectively rotate the actuator rod to shift the transmission in response to the signals received from the control unit.

In another aspect of the present invention, an electronic transmission shift system is provided that is adapted to shift an existing automatic transmission for a vehicle, where the existing automatic transmission includes gearing movable to a plurality of different gear positions, and further includes an actuator rod connected to the gearing and rotatable to selectively shift the gearing between the gear positions. The shift system includes a control unit programmed to generate signals to control shifting of the transmission, and a stepper motor unit configured for mechanical attachment to the actuator rod and electrically connected to the control unit. The stepper motor unit is configured to selectively rotate the actuator rod to shift the transmission in response to the signals received from the control unit.

In yet another aspect of the present invention, an electronic transmission shift system is adapted to cooperate with a vehicle control unit for shifting an existing automatic transmission for a vehicle, where the existing automatic transmission includes a casing, and further includes gearing movable to a plurality of different gear positions, and still further includes an actuator rod connected to the gearing and rotatable to selectively shift the gearing between the gear positions, with the actuator rod having a male end. The control unit is programmed and configured to generate signals to control shifting of the transmission. The improvement includes a stepper motor unit having a housing, an end configured to matingly engage the male end of the actuator rod, and a stepper motor connected to the connector for moving the actuator rod selectively to the different gear positions.

These and other features, advantages, and objects of the present invention will be further understood and appreciated by those skilled in the art by reference to the following specification, claims, and appended drawings.

DETAILED DESCRIPTION OF PREFERRED EMBODIMENTS

An external electronic shifting system 20 (FIG. 1) embodying the present invention is provided that is adapted to attach to and electronically shift an existing automatic transmission 21 of a vehicle without requiring substantial modification or redesign of the transmission 21. The shift system 20 includes a stepper motor unit 26 mechanically connected to the vehicle transmission 21 and electrically connected to a vehicle control unit 23, such as an on-board computer or microprocessor. The shift system 20 further includes a driver interface module for receiving inputs from the driver to shift the transmission. The illustrated driver interface module is a shifter 24, but it is contemplated that it could include different arrangements, such as pushbutton controls, miniaturized knobs, touch pads, joysticks, or other modern electronic devices for providing a control input. The illustrated shifter 24 has a shift lever 24" and a potentiometer 24' for sensing angular positions of the shift lever 24", with the potentiometer 24' also being electrically connected to the control unit 23. The arrangement permits shifting the existing automatic transmission 21 with a fully electronic system that characteristically does not include a mechanical linkage from a shift lever to the transmission 21, even though the transmission 21 was originally designed for such a mechanical linkage. This advantageously permits "shift-by-wire" shifting systems to be integrated into new vehicles while utilizing existing transmissions and existing transmission technologies, yet prevents costly redesign and retooling of the existing transmission 21. An important advantage of the present invention is that the shift system 20 can be configured to be attachable to a casing 27 of an existing transmission 21 with only little or no modification, and further that it can successfully be used even in particularly harsh environments, such as near an exhaust pipe 21'. It is contemplated that the present shift system 20 could be retrofittably attached to previously produced transmissions if desired. It is also contemplated that the present invention can be used on new transmissions.

Figure 1:
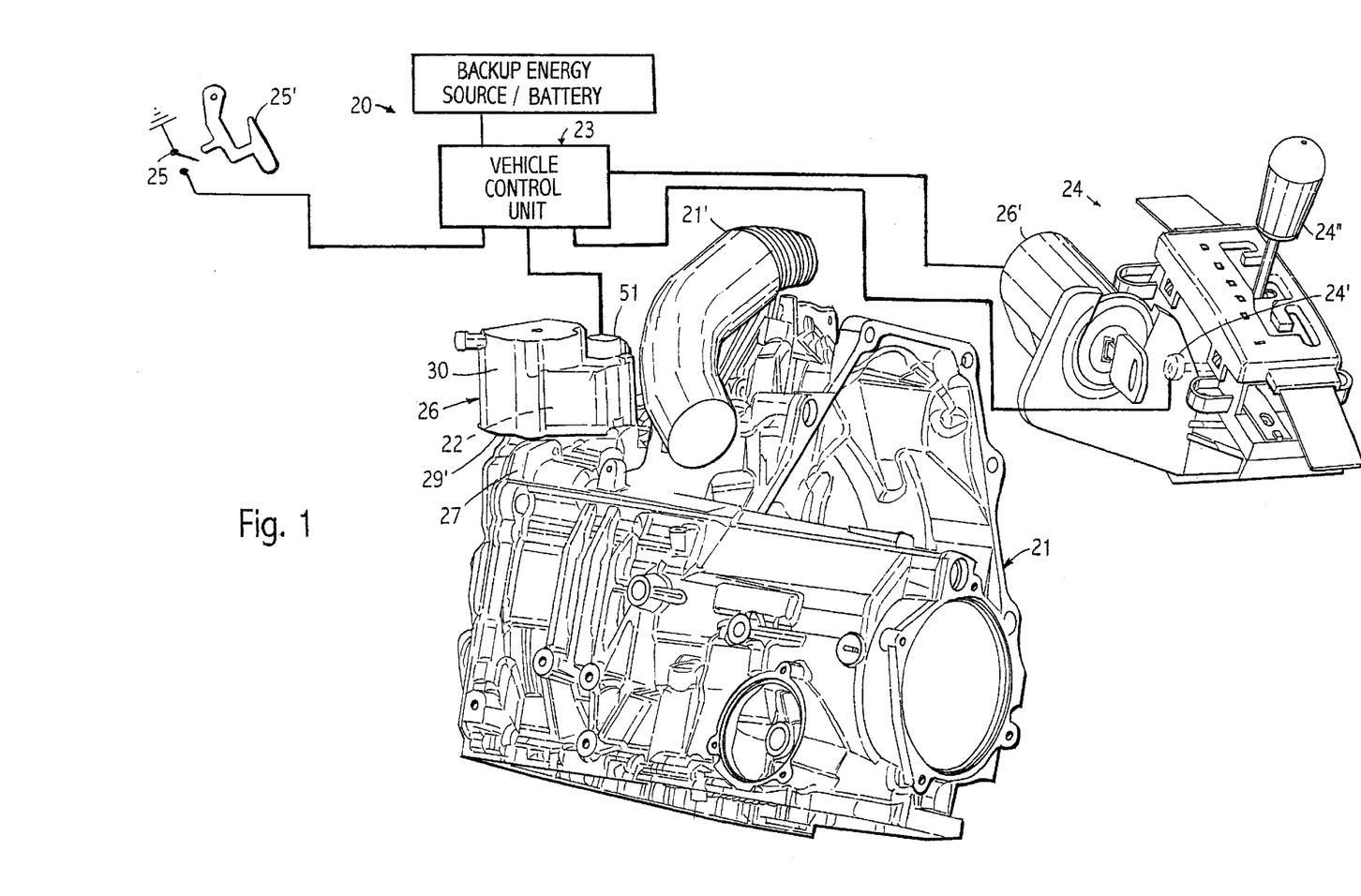
FIG. 1 is a perspective view of a vehicle shift system embodying the present invention, including an automatic transmission, a stepper motor unit on the transmission, a driver interface module comprising a shifter, a brake pedal, and a vehicle control unit.
Figure 3:
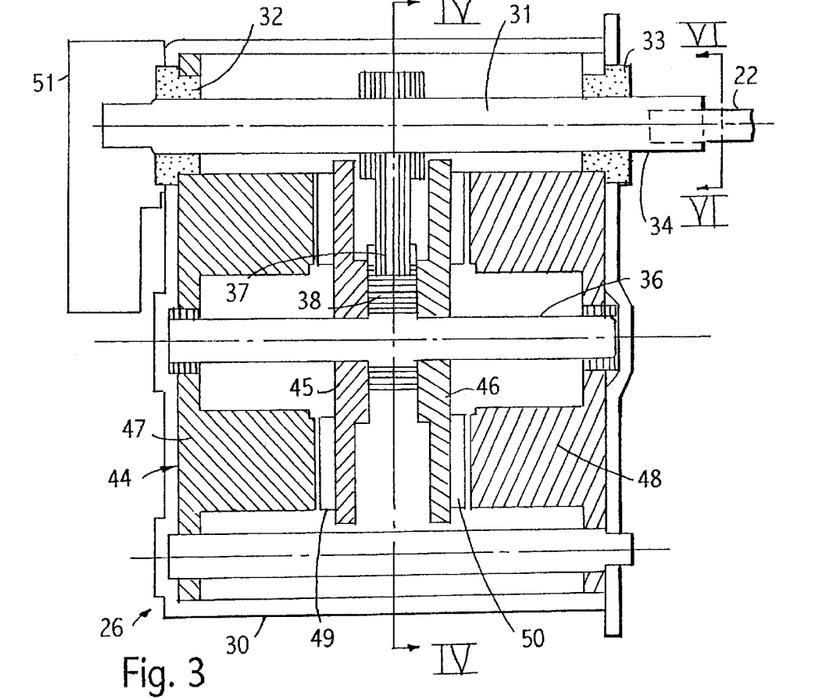
FIG. 3 is a cross-sectional view taken through the stepper motor unit shown in FIG. 1.
Figure 4:
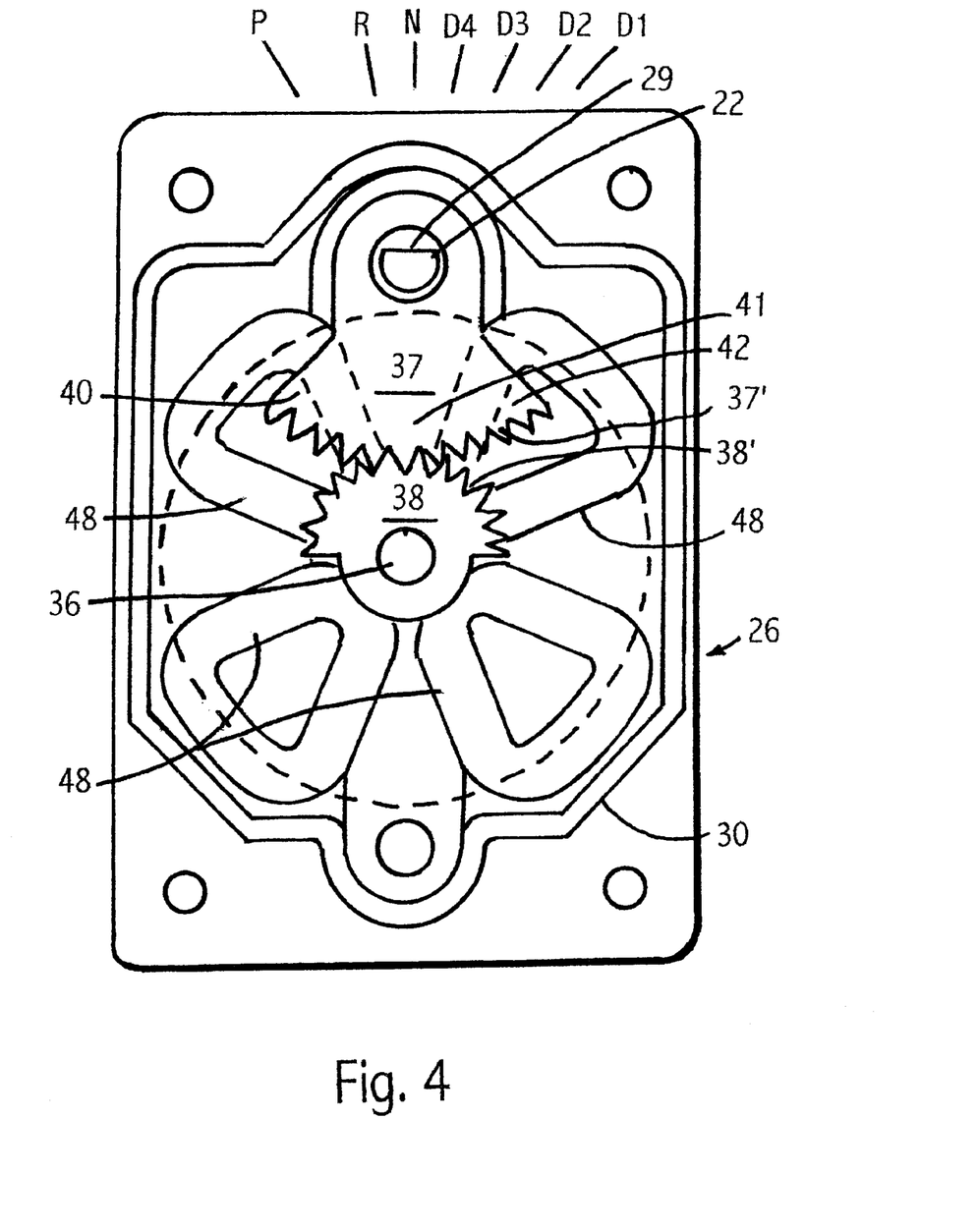
FIG. 4 is a view taken along lines IV—IV in FIG. 3.

More specifically, the automatic transmission 21 includes internal gearing movable to a plurality of different gear positions, such as park, reverse, neutral, and drive gears, and further includes an actuator rod 22 (FIG. 2) connected to the gearing that is rotatable to positions "P," "R," "N," "D4," "D3," "D2," and "D1" (FIG. 4) to selectively shift the gearing between the gear positions. In addition to being electrically connected to the potentiometer 24' (FIG. 1) for sensing the gear position of shift lever 24", the vehicle control unit 23 can also operably connect to vehicle sensors to receive electrical signals indicative of vehicle conditions. For example, the illustrated control unit 23 is connected to a brake switch 25 to show that brake pedal 25' is depressed. The control unit 23 can also be connected to sensors for inputting vehicle speed, engine parameters, ignition switch position, and the like. The control unit 23 is programmed to generate signals based on these inputs to control shifting of the transmission 21. For example, the control unit 23 can be programmed to prevent shifting out of the park position unless the brake is depressed and the ignition switch is on. The stepper motor unit 26 is mechanically attached to the actuator rod 22 (FIG. 3) and electrically connected to the control unit 23 (FIG. 1). The stepper motor unit 26 is configured to selectively rotate the actuator rod 22 to selectively shift the transmission 21 between gear positions in response to the control signals received from the control unit 23. Advantageously, the stepper motor unit 26 is lightweight, compact, fast acting, and very durable, as discussed below.

Figure 2:
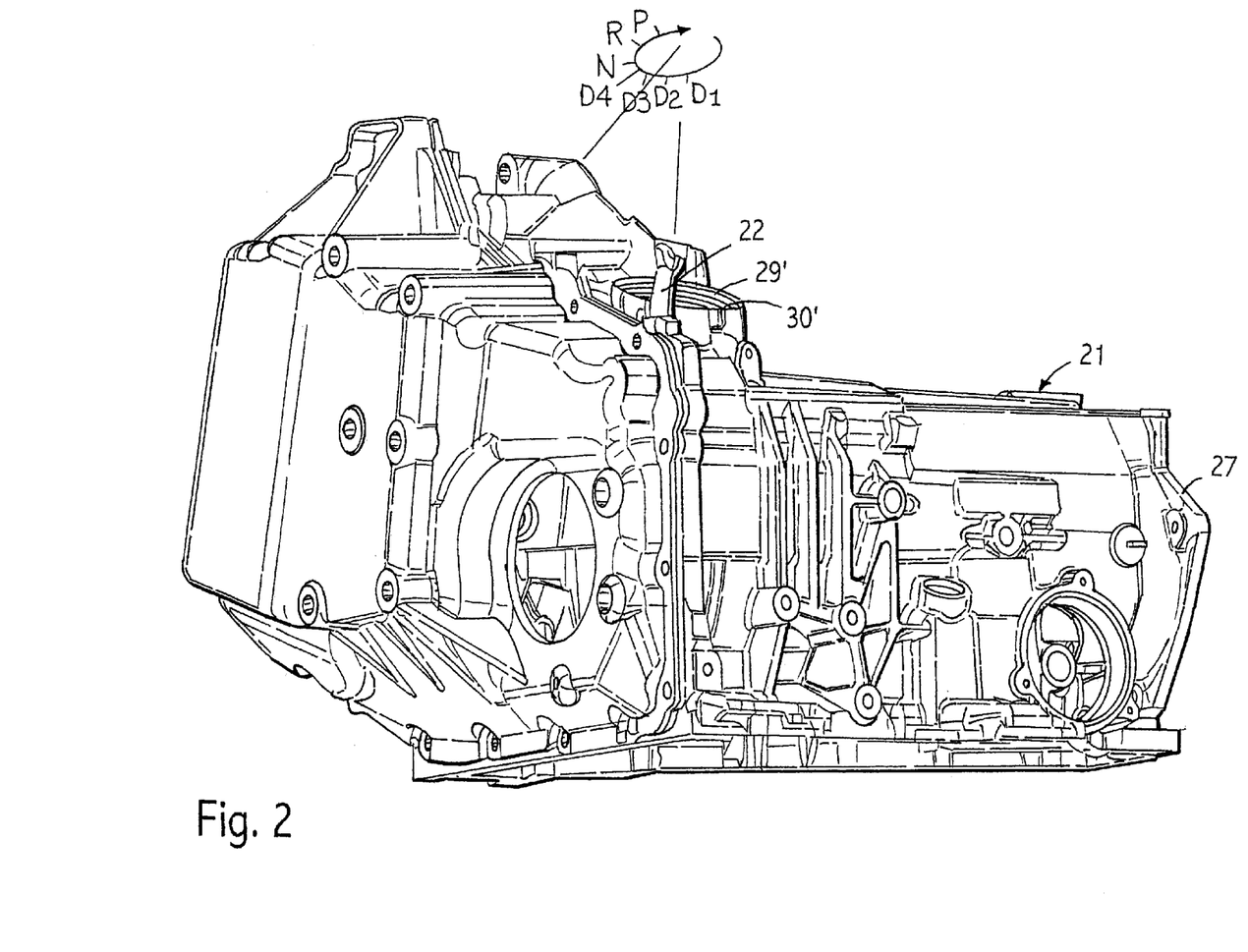
FIG. 2 is a perspective view of the transmission shown in FIG. 1, but with the stepper motor unit removed to show the actuator rod.
Figure 5:
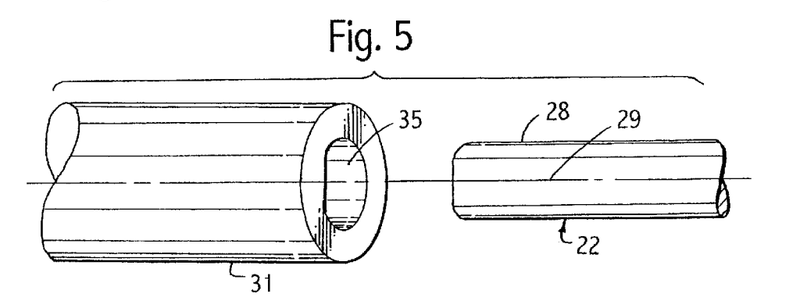
FIG. 5 is an exploded fragmentary perspective view of the stepper-motor-to-actuator-rod connection.

The actuator rod 22 (FIG. 5) comprises a shaft having a male end 28 that protrudes from the transmission casing 27 (FIG. 2). A flat surface 29 (FIG. 5) is formed on one side to provide a keyed surface or gripping surface for engaging the male end 28 to rotate the shaft. The illustrated casing 27 (FIG. 2) includes a mounting area 29' having threaded holes for receiving screws for attaching the stepper motor unit 26 to the casing 27. Notably, the illustrated mounting area 29' is already on the existing casing 27, since it is the mounting location for the "neutral start backup switch" which is eliminated by the present shifting system 20. Therefore, the illustrated casing 27 does not need to be modified to receive the stepper motor unit 23. Nonetheless, it is contemplated that a scope of the present invention, in some circumstances, includes a minor modification to casing 27.

Figure 6:
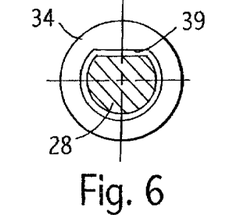
FIG. 6 is a cross-sectional view taken along the line VI—VI in FIG. 3.
Figure 7:
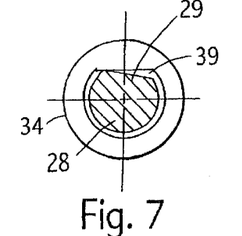
FIG. 7 is similar to FIG. 6, but showing angular clearance in the actuator rod.

Stepper motors are well known in the art and it is contemplated that they can be constructed to rotate actuator rod 27. The illustrated stepper motor unit 26 and stepper motor 44 use technology of CTS of Canada and Limited Streetsville, Ontario, Canada. The illustrated stepper motor unit 26 (FIG. 3) includes a housing 30 shaped to mateably engage the mounting area 29' and to be secured in place by screws engaging holes 30' (FIG. 2). A driver rod 31 (FIG. 3) is rotatably supported on the housing 30 by bearings 32 and 33. The driver rod 31 has an end 34 with a recess 35 therein. The recess 35 (FIG. 5) is "D" shaped and has a flat side surface and is configured to matingly engage the male end 28 of the actuator rod 22 so that the actuator rod 22 rotates when the driver rod 31 rotates. A rotor-supporting rod 36 (FIG. 3) is also rotatably supported on the housing 30. Intermeshing gears 37 and 38 are mounted on the rods 31 and 36, respectively, and include interengaging teeth 37' and 38' that form a mechanism for rotating the driver rod 31 to a first set of angular positions as the second rod 36 is moved to a second set of angular positions. Specifically, the intermeshing gears 37 and 38 engage and have a length providing a particular ratio with respect to each other so that when the rotor-supporting rod 36 is located in any one of the second set of angular positions, the driver rod 31 and the actuator rod 22 are located in a respective selected one of a first set of angular positions, with the first set of angular positions corresponding closely to the gear positions P, R, N, D4, D3, D2, and D1 of the actuator rod 22 of the transmission 21. Specifically, in the present example, the gear positions P, R, N, D4, D3, D2, and D1 are located at successive angles of 23.2°, 11.1°, 11.1°, 10.8°, 10.8°, and 10.8°. The second set of angular positions for the rotor-supporting rod 36 is 90°, 45°, 45°, 45°, 45°, and 45°. As is apparent from comparing the first and second sets of angular positions, there is a slight but significant mismatch between the two sets. Specifically, the steps in the first set are not uniform, nor are they multiples of a uniform angular step. This mismatch can be handled in many different ways. For example, the mismatch problem can be handled by creating a looseness or clearance 39 in the connection between the male end 28 and the transmission actuator rod 22 (see FIG. 6 which shows the male end 28 and the actuator rod 22 aligned and with the clearance 39 extending continuously therearound, and FIG. 7 which shows the male end 28 turned slightly to engage and rotate the actuator rod 22 in a clockwise direction). The transmission 21 has an internal detent mechanism that naturally biases the gearing to an "on-center" location for each of the gear positions P, R, N, D4, D3, D2, and D1 when the actuator rod 22 approaches a selected gear position. Therefore, the clearance 39 allows the rod 31 to find its own rest point once it is moved close to a selected position.

Alternatively, this mismatch of angular positions can be handled by changing the spacing of one (or more) sections of the teeth 37' and 38'. For example, the outermost three teeth 37' in the area 40 (FIG. 4) are spaced circumferentially apart an increased angular amount. Thus, as the teeth 37' and 38' engage in the area 40, the gear 37 rotates 23.3° (i.e., more than two times 11.1°) between gear positions P and R as the gear 38 rotates 90°. In the area 41, the teeth 37' and 38' are spaced so that the gear 37 rotates 11.1° between gear positions R and N (and between N and D4) as the gear 38 rotates 45°. The outermost three teeth 37' in the area 42 are spaced circumferentially apart a decreased angular amount. Thus, as the teeth 37' and 38' engage in the area 42, the gear 37 rotates 10.8° between gear positions D4 and D3 (and also between D3 and D2, and also between D2 and D1) as the gear 38 rotates 45°. It is contemplated that other means can also be developed to provide this non-uniform angular correspondence, such as by using a cam or a chain-driven off-center wheel.

Stepper motors are well known in the art and it is contemplated that artisans familiar with stepper motor technology could construct a stepper motor unit having a mechanism that would permit the stepper motor to selectively step the actuator rod 22 to its various angular positions. The illustrated stepper motor unit 26 (FIGS. 3 and 4) includes a stepper motor 44 incorporating the rotor-supporting rod 36 for moving the rotor-supporting rod 36 selectively to each one of the first set of angular positions. The illustrated stepper motor 44 comprises two rotors 45 and 46 positioned generally in a middle of the rotor-supporting rod 36 on opposite sides of the gear 38. The rotors 45 and 46 are securely mounted on the single common shaft (i.e., rod 36). The stepper motor 44 further has two opposing stators 47 and 48 fixed to the housing 30 at opposing ends of the rotor-supporting rod 36. The stator 47 and rotor 45 form a first rotary actuator, and the stator 48 and rotor 46 form a second rotary actuator, each of which are independently wired and connected to the control unit 23. The stators 47 and 48 are offset 45° from each other, such that they can be operated in a coordinated fashion to achieve the angular positions desired, as described below.

The illustrated rotors 45 and 46 carry permanent magnets 49 and 50, with the magnets in one rotor being shifted 45° with respect to the magnets in the other rotor. The stators 47 and 48 have one set of coils each and, as noted above, the two stator windings are electrically independent from each other. This results in a two-phase stepper motor in which each phase can be powered, or not, independently from the other.

The direction of the torque developed by one actuator depends on the polarity of the current through its winding. Applying "positive" current results in a "positive" torque, e.g., one in a clockwise (CW) direction, and vice versa. The points at 0° and at 90° on the plot of FIG. 11 correspond to rotor positions in which each permanent magnet (North, South, North, South) on the rotor is facing directly one electromagnet in the stator. These points are called the "magnetic detents" of the actuator. Applying current to the stator winding when the rotor is at a "magnetic detent" does not make it develop torque, as it can be seen in FIG. 11; the torque is negligible at 0° and at 90°. Some misalignment between permanent magnets and electromagnets is needed in order to develop torque, which is the result of repulsion forces between like magnetic polarities and attraction forces between opposite polarities.

Figure 11:
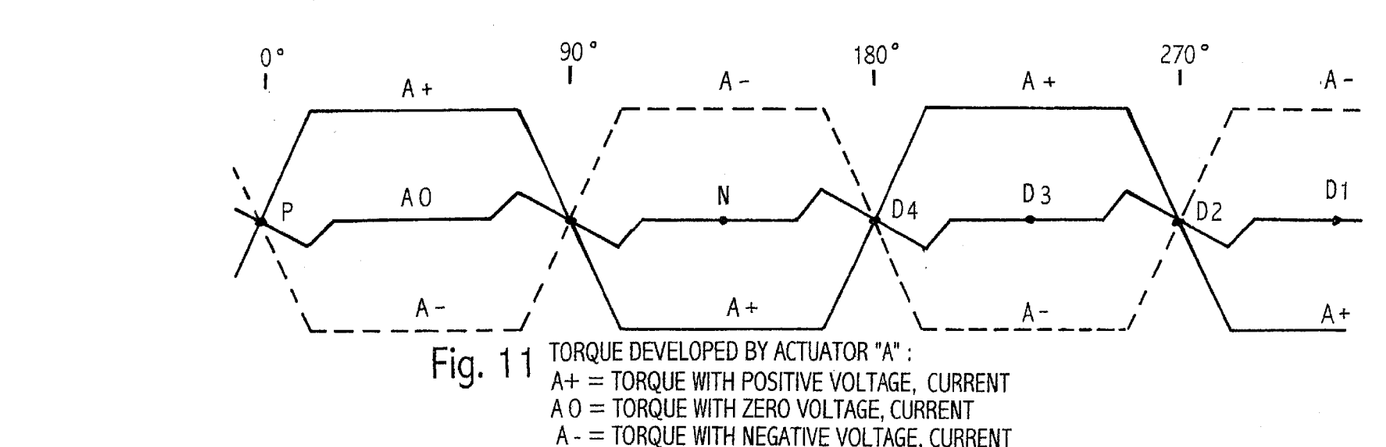
FIGS. 11 and 12 are schematic graphs showing "detent" forces generated by the stepper motor shown in FIGS. 3 and 4 when the stepper motor is in a non-energized state.

The plot of FIG. 11 shows that if there is no current applied to the winding, and the rotor is in the 20° to 70° range, then the torque is virtually zero. This means that the rotor can be "parked" anywhere within that angular range. Nevertheless, closer to a "magnetic detent," for example between 0° and 20°, there is a torque; in this case, a negative one reaching a peak of some 80 ounces-inches at about 13°, that pulls the rotor toward the 0° position. This is called a "detent torque" and it can be used to "hold" the rotor at a given detent position without using any power.

Figure 12:
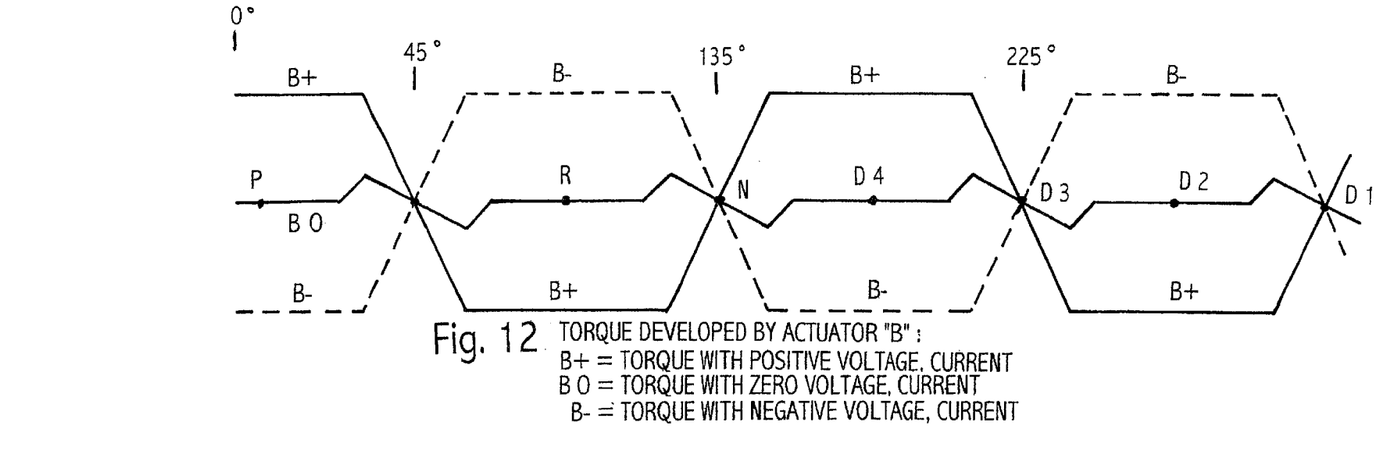

The gears 37 and 38 in the stepper motor 44 convert the angles of the actuators' shaft into the angles required at the transmission shaft or rod 22. For example, the 90° rotation in FIG. 11 corresponds to the 23.2° angle specified between P and R and so forth. FIGS. 11 and 12 show the output torque developed by two actuators as the shaft rotates from P to D1.

The reason for having the permanent magnets in one rotor shifted with respect to those in the other rotor is obvious in view of FIGS. 11 and 12. The shift in angular positions causes one actuator to be at the center of its useful torque-developing angular range when the other actuator is at a detent point. Thus, by applying voltages with suitable polarities, it is always possible to develop CW or counter-clockwise (CCW) torque. In all the plots, a (+) torque tends to rotate the shaft toward the right, e.g., CW, and vice versa.

Figure 8:
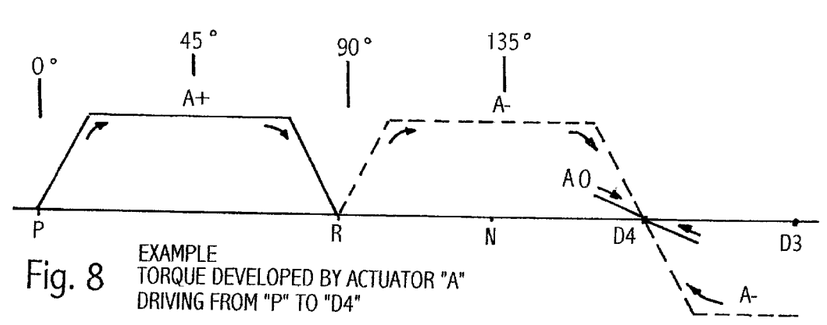
FIGS. 8–10 are schematic graphs showing forces generated by the stepper motor shown in FIGS. 3 and 4 at different angular positions of the rotor of the stepper motor.

FIG. 8 shows the torque developed by one actuator "A" in the stepper motor as the motor is driven from P to D4. Notably, between P and R, the actuator has (+) polarity in order to develop (+) torque that drives the shaft CW toward D4. At the R position, the voltage polarity is reversed from (+) to (−). Between R and D4, the polarity is kept (−) in order to develop (+) torque again. If the shaft overshoots and rotates beyond D4, the polarity is still kept (−) in order to develop a (−) torque that makes the shaft return CCW toward D4.

Figure 9:
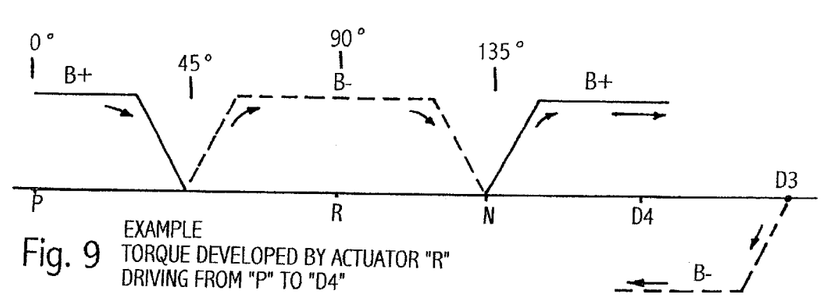

FIG. 9 shows the torque developed by the other actuator "B." Between P and midway to R, the actuator has (+) polarity in order to develop (+) torque that drives the shaft CW toward D4. Midway between P and R, the voltage polarity is reversed from (+) to (−). From that point to N, the polarity is kept (−) in order to develop (+) torque again. At N, the voltage is reversed from (−) to (+) in order to develop (+) torque again. If the shaft overshoots and rotates beyond D4, the polarity is reversed from (+) to (−) in order to develop a (−) torque that makes the shaft return CCW toward D4.

Figure 10:
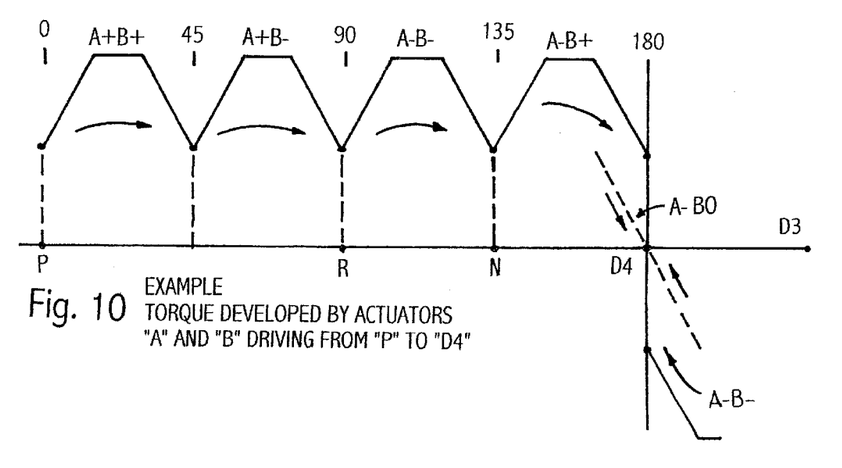

FIG. 10 shows the torque developed by the two actuators together. There is a "coarse state" and a "fine stage" in the approach to the target position D4. In the coarse state, between P and D4, the actuator polarities are such that the motor develops only a (+) torque in order to drive the shaft CW toward D4. In the fine stage, when D4 is approached, the actuator "A" is kept fully energized in order to maximize its detent torque, and thus help the shaft stop at D4. Actuator "B" may be energized (+) to continue to develop a (+) torque and move CW to the right or, if the shaft passes beyond D4, it may be energized (−) to develop a (−) torque and move CCW to the left.

The control unit 23 (FIG. 1) is operably connected to various vehicle sensors to assure that various predetermined vehicle conditions are met before shifting is allowed. For example, the illustrate control unit 23 is connected to the brake switch 25 and programmed to assure that brake pedal 25' is depressed and the ignition switch 26' is in an "on" position before the stepper motor 44 can be actuated. It is contemplated that the control unit 23 can be connected to other vehicle sensors as well. For example, some manufacturers will have a sensor positioned to determine vehicle speed, so that a shift from D into R is prevented until the vehicle speed is below a preset value.

The present shift system 20 can be operated without a continuous output potentiometer on the stepper motor unit 26. However, an improved arrangement can be accomplished by positioning a potentiometer 51 (FIG. 3) on the shaft 31 (or on the shaft 36 of the stepper motor 44) and connecting the potentiometer 51 to the vehicle control unit 23. By this arrangement, the control unit 23 senses the angular position of the stepper motor 44 and the transmission actuator rod 22.

Figure 13:
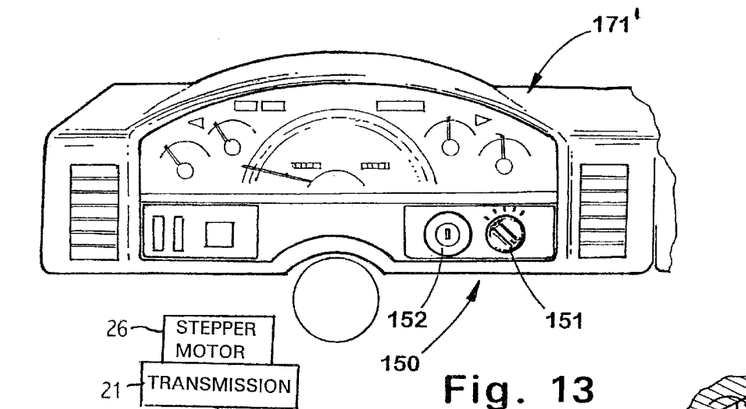
FIG. 13 is a front view of a miniaturized shifter useable with the present invention.
Figure 14:
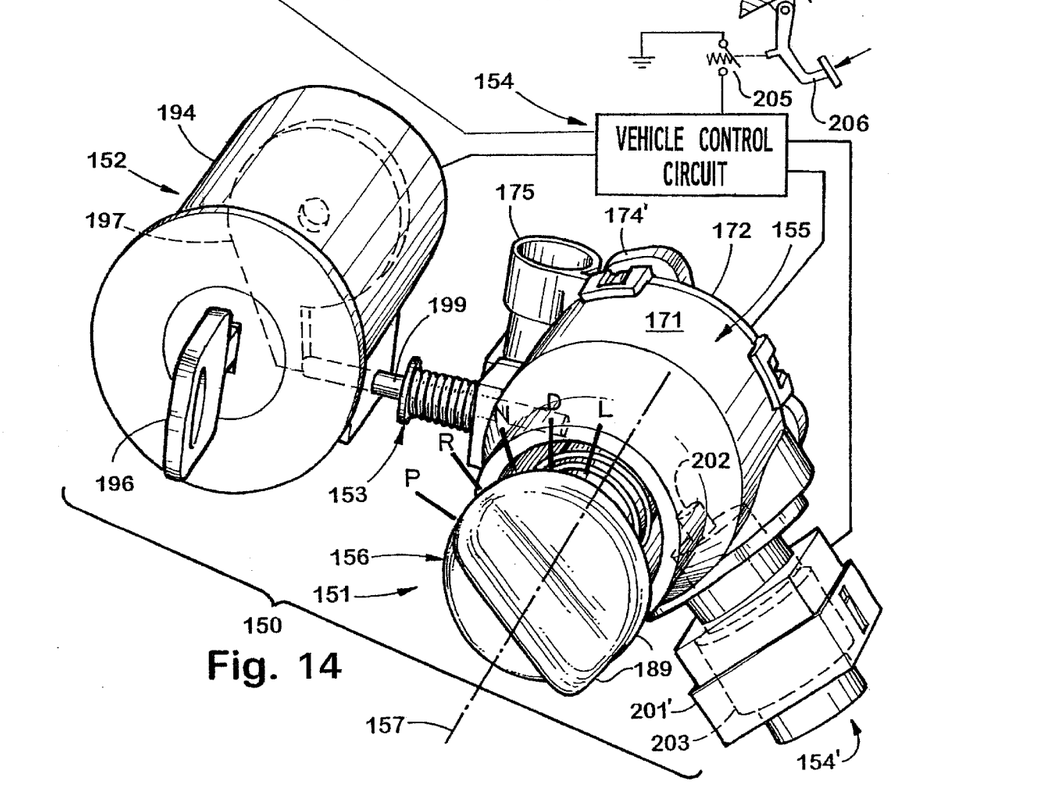
FIG. 14 is a perspective schematic view showing the miniaturized shifter of FIG. 13 connected to a control circuit similar to that shown in FIG. 1.

It is contemplated that the shifter used to feed information to the control unit 23 can be many different configurations. FIGS. 13 and 14 disclose a miniaturized shifter 150 having a potentiometer 172. This miniaturized shifter 24A and several other shifters are described in U.S. patent application Ser. No. 09/377,567, filed Aug. 19, 1999, entitled Miniaturized Transmission Shifter, which is incorporated herein in its entirety. Additional electronic shifters are described in a U.S. patent application Ser. No. 08/962,434, filed Oct. 31, 1997, entitled Electrical Sensing System for a Vehicle Shifter, which also is incorporated herein in their entirety.

Figures 18, 19:
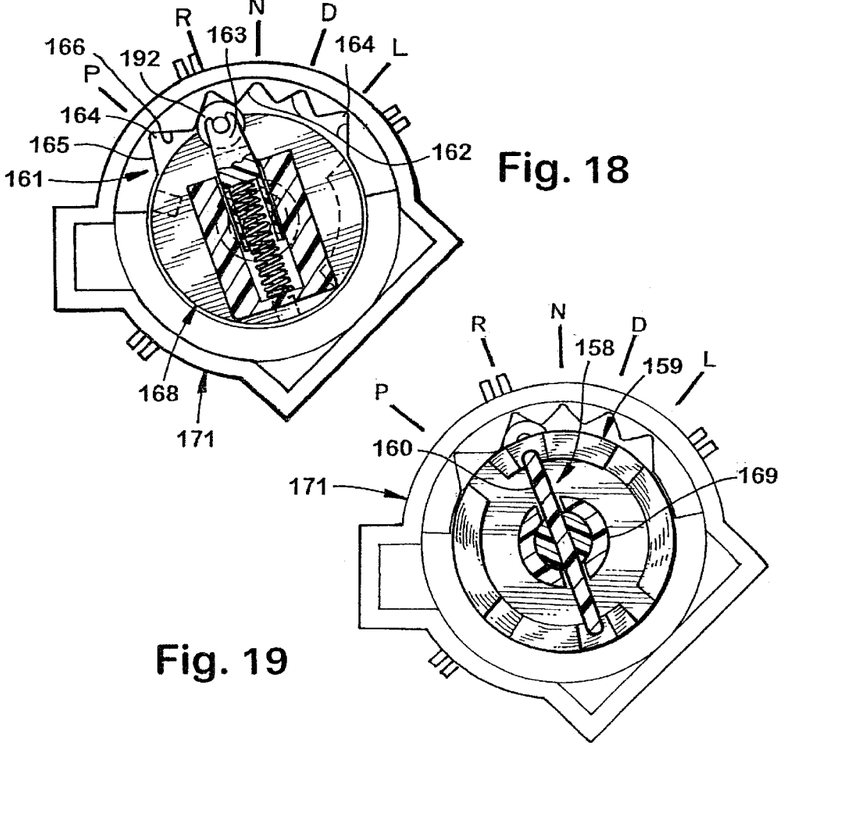
FIGS. 18 and 19 are cross-sections taken along the lines XVIII—XVIII and XIX—XIX in FIG. 17.
Figure 20:
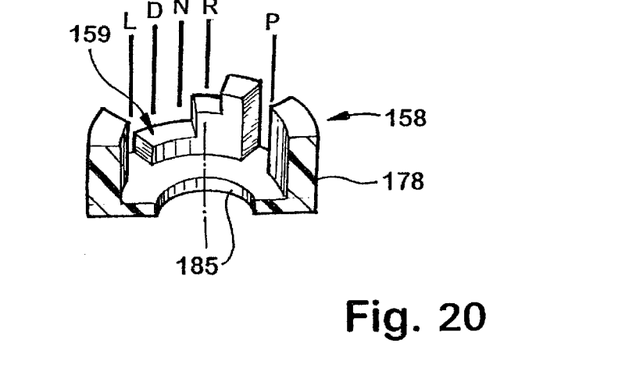
FIG. 20 is a fragmentary perspective view of the pawl-receiving notches that define gear positions on the shifter.
Figure 26:
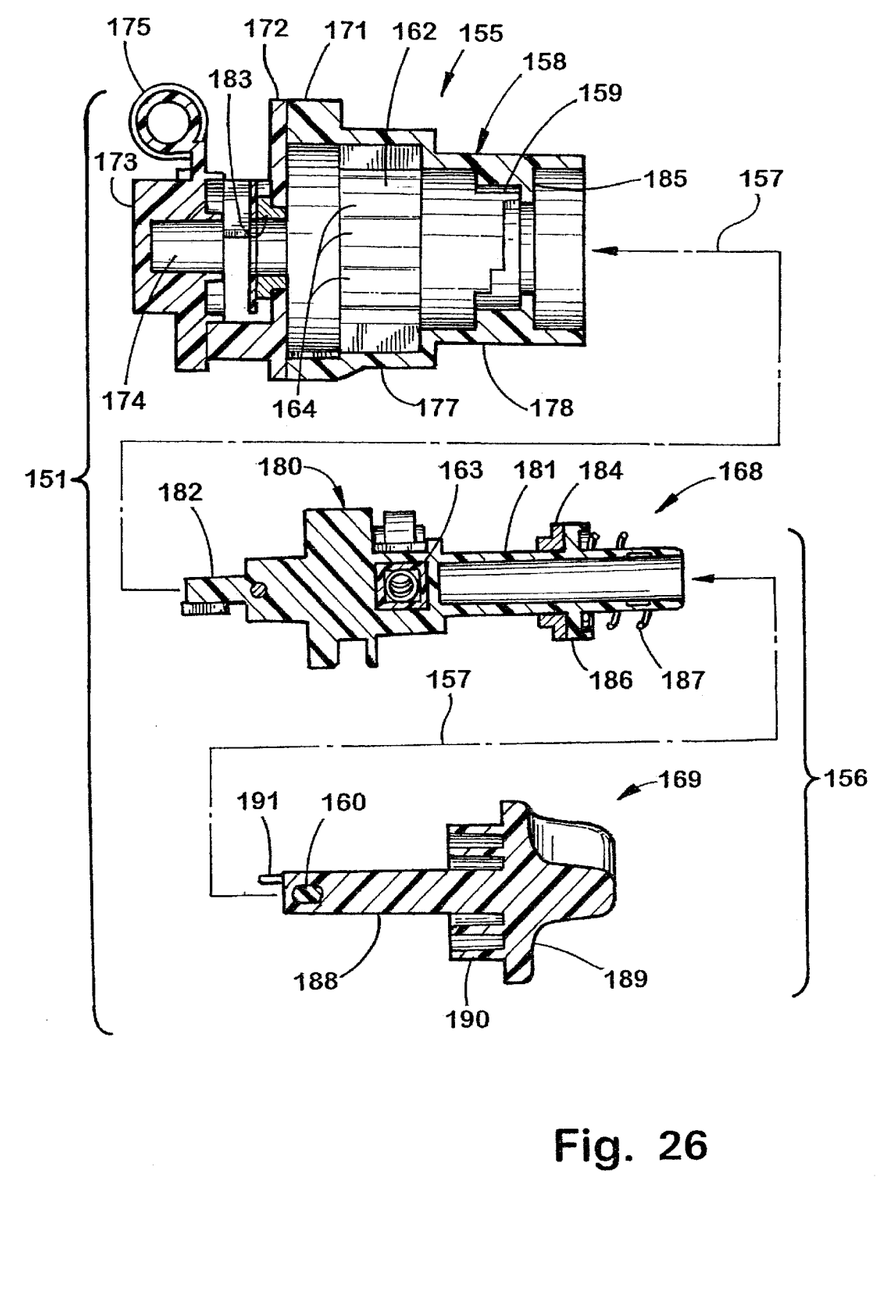
FIG. 26 is an exploded view of the shift lever subassembly in FIG. 25.

The modified apparatus 150 (FIGS. 13 and 14) includes a miniaturized shifter 151 (FIG. 14), an ignition switch 152 coupled to the shifter by an interlock device 153, and a vehicle control circuit 154 operably connected to an electromechanical device 154' for selectively engaging the shifter to control movement of the shifter until predetermined vehicle operating conditions are met. The shifter 151 has a base 155 and has an elongated shift lever subassembly 156 rotatably mounted on the base 155 for movement between a plurality of gear positions, such as park P, reverse R, neutral N, drive D, and low gear drive L (or such as P, R, N, D, 2, and 1). The shift lever subassembly 156 is rotatable about an axis of rotation 157 that extends parallel a length of the shift lever subassembly 156. A detent device 158 (FIGS. 26 and 27) includes an irregular surface 159 defining the gear positions P, R, N, D, and L (or gear positions P, R, N, D, 1 and 2) on the base 155. The detent device 158 further includes a pawl 160 on the shift lever subassembly 156 with two ends, each of which telescopingly operably engage the irregular surface 159 to prevent undesired rotational movement of the shift lever subassembly 156 between at least some of the gear positions until the pawl 160 is disengaged from the irregular surface 159. A feel positioner 161 (FIG. 18) is also provided on the apparatus 150 and includes an undulated surface 162 separate from the irregular surface 159 on the base 155, and further includes a spring-biased protrusion 163 on the shift lever subassembly 156. The undulated surface 162 has depressions 164 accurately aligned with each of the gear positions P, R, N, D, and L and enlarged opposing ramps (e.g., ramps 165 and 166) inclined toward a center of each depression 164. The spring-biased protrusion 163 operably engages the undulated surface 162 to provide a feel to a vehicle driver as the vehicle driver shifts the shift lever subassembly 156 between the gear positions P, R, N, D, and L, and further the arrangement is configured to bias the shift lever subassembly 156 toward a center of each gear position. The arrangement requires that the shift lever subassembly 156 must be manipulated by a vehicle operator both telescopingly and rotationally to select different ones of the gear positions.

Figure 17:
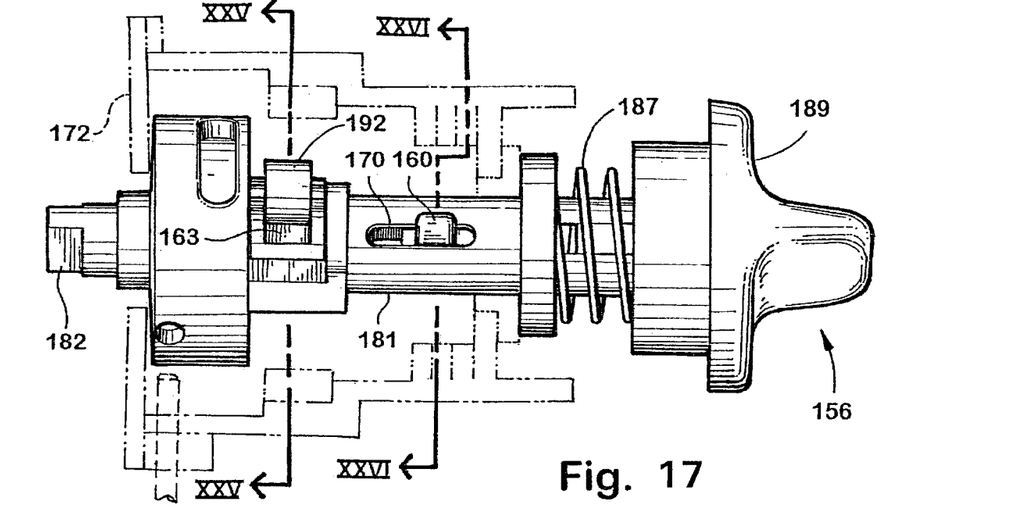
FIG. 17 is a side view of the shifter knob subassembly shown in FIG. 16.

The shift lever subassembly 156 (FIG. 26) includes a lever support 168 that rotatably engages the base 155, and further includes a shift lever member 169 that telescopingly engages the lever support 168. The pawl 160 is fixed to the shift lever member 169 and extends radially through longitudinal slots 170 (FIG. 17) in the lever support 168, such that the shift lever member 169 rotates with the lever support 168 when the lever support 168 is rotated, as described below.

Figure 21:
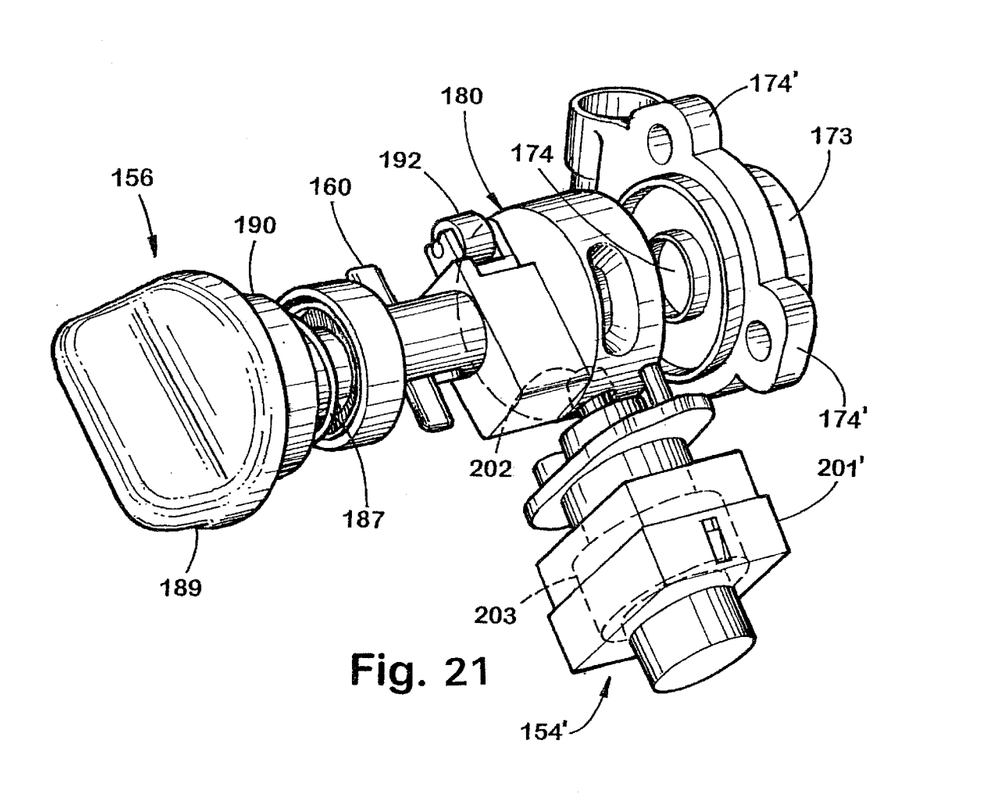
FIG. 21 is a perspective view of the shifter knob subassembly and the BITSI solenoid, the housing of the shifter knob subassembly being removed to better show internal components.
Figure 22:
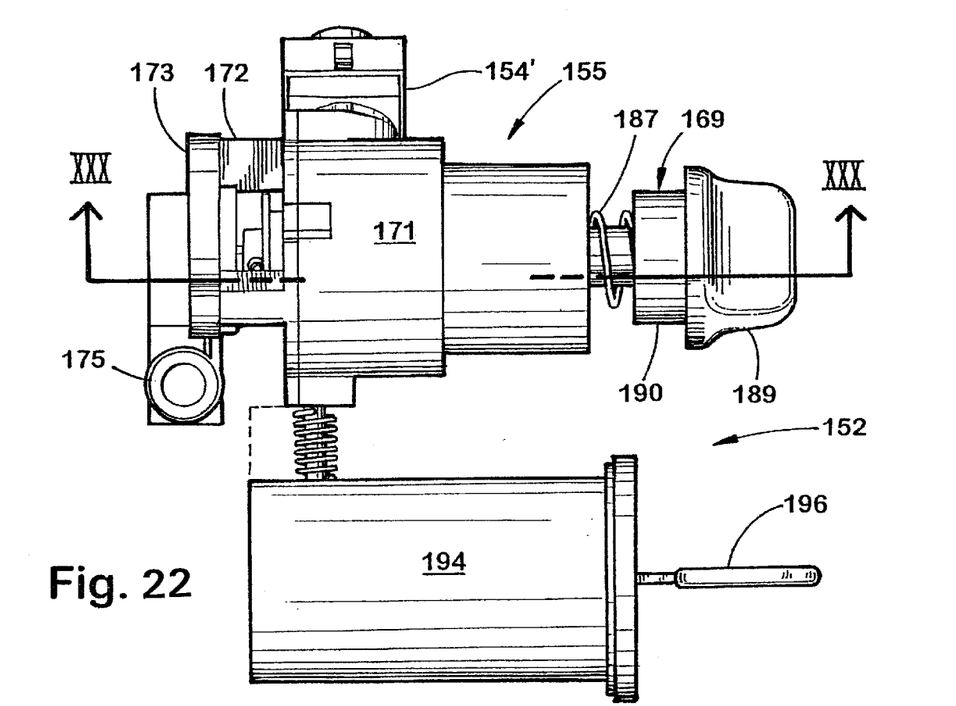
FIG. 22 is a top view of the shifter-and-ignition-switch assembly shown in FIG. 14.
Figure 23:
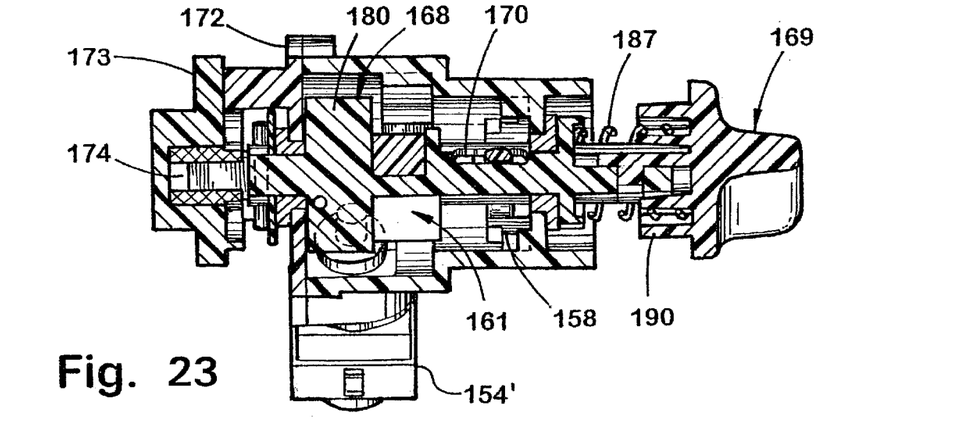
FIG. 23 is a cross-sectional view taken along the line XXIII—XXIII in FIG. 22.
Figure 24:
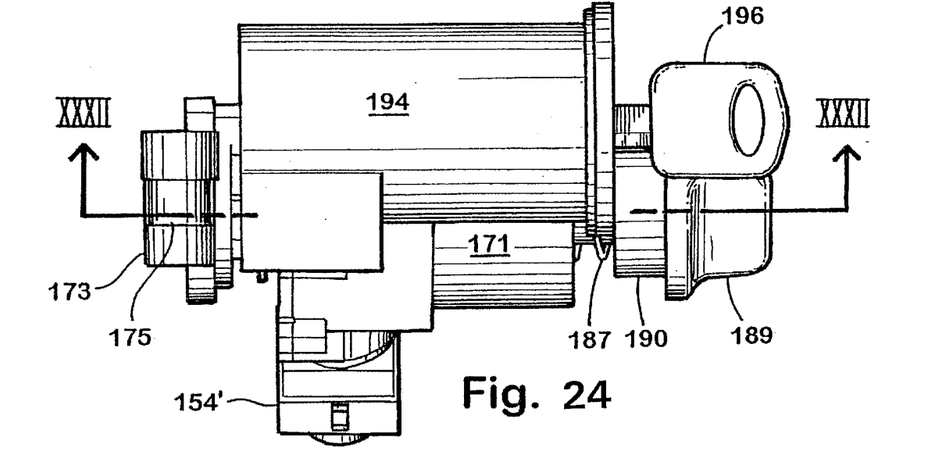
FIG. 24 is a side view of the shifter-and-ignition-switch assembly shown in FIG. 14.
Figure 25:
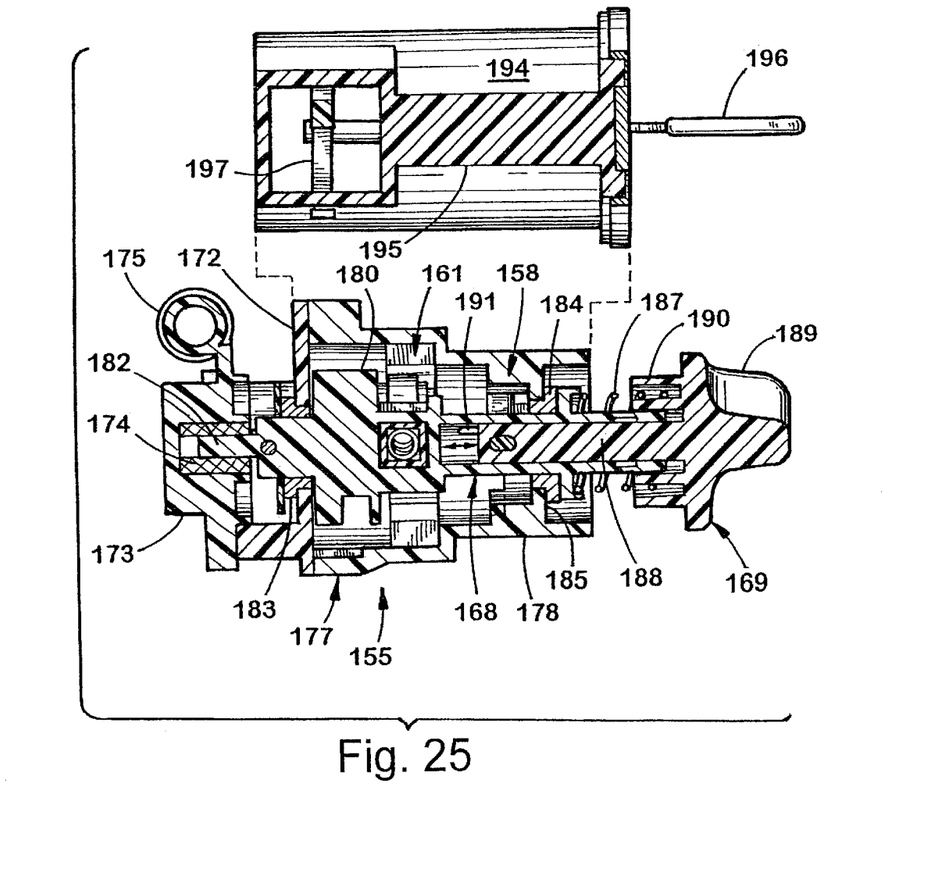
FIG. 25 is a cross-sectional view taken along the line XXV—XXV in FIG. 24.

The base 155 (FIG. 14) includes a housing 171 configured for secure attachment to a vehicle instrument panel, such as instrument panel 171' (FIG. 13), and further includes an end piece 172 snap attached to the housing 171 to substantially close the cavity within the housing 171. A bottom piece 173 is attached to the housing 171 and the end piece 172. The bottom piece 173 includes apertured flanges 174' (FIG. 21) with holes for receiving attachment screws for securement to the bottom of housing 171. The bottom piece 173 has a hollow body configured to hold a potentiometer 174 (FIG. 25) at an end of the cavity within housing 171, as described below. A wire holding flange 175 (FIG. 14) is integrated into the bottom piece 173, for holding wires that extend from the potentiometer 174.

The housing 171 of base 155 (FIG. 26) has a first section 177 with the undulated surface 162 formed integrally on its inner surface, and has a second section 178 with the irregular surface 159 formed integrally on its inner surface. The surfaces 159 and 162 are formed as separate surfaces and are spaced apart so that each surface 159 and 162 can be independently formed for optimal performance.

The shift lever support 168 (FIG. 26) includes an elongated body with an enlarged section 180 and a tube-shaped second section 181. The enlarged section 180 includes a finger 182 with a flat or keyed surface thereon that is shaped to mateably engage the potentiometer 174, such that the potentiometer 174 rotates when the shift lever support 168 is rotated. The base of the finger 182 engages a first bearing 183 in the end piece 172 to rotatably support that end of the shift lever support 168, and an intermediate portion of the tube-shaped second section 181 engages a second bearing 184 supported in the housing 171 at annular inner wall 185. A radially extending flange 186 on the tube-shaped second section 181 engages the bearing 184. A coil spring 187 is positioned against the flange 186 and extends in an opposite direction.

The shift lever member 169 (FIG. 26) includes an elongated rod-shaped section 188 configured to telescopingly fit within the tube-shaped second section 181 if the lever support 168. A handle 189 extends from the rod-shaped section 188. The handle 189 has side surfaces that slope together so that they are configured to receive a vehicle operator's thumb and first finger for easy grasping and rotating of the shift lever member 169. Circumferential flanges 190 are formed under the handle 189 for capturing and hiding the outer end of the spring 187. The length of the flanges 190 and/or the length of the axially extending stopper 191 (at an end of the rod-shaped section 188) are shaped to engage abutting structure on the housing 171 to form a stop arrangement that limits the telescoping movement of the shift lever member 169 on the lever support 168.

During assembly of the shift lever member 169 to the shift lever support 168, the shift lever member 169 is extended into the shift lever support 168 with the spring 187 in place on the shift lever member 169. Once in position, the pawl 160 is extended through a side of the housing 171 and press-fit into a hole in the rod-shaped section 188 of the shift lever member 169. Once released, the spring 187 biases the pawl 160 telescopingly into engagement with the notches in the irregular surface 159. The presence of pawl 160 prevents the shift lever member 169 from being removed from within the shift lever support 168. The notches are shaped to prevent rotation of the shift lever subassembly 156 in predetermined gears until the shift lever member 169 is telescopingly depressed. For example, the notch corresponding to the park position P prevents the shift lever member 169 from being rotated until the pawl 160 is disengaged from this notch. Also for example, the pawl 160 engages the notch corresponding to neutral position N in a way that prevents accidentally shifting into reverse position R, but it allows rotation from neutral position N into drive position D without telescopingly depressing the shift lever member 169. The reasons for the shapes of different notches are well known in the art in traditional shifters, such that further explanation of the present notched shapes is not necessary for an understanding of the present invention. A roller 192 (FIGS. 25 and 28) is positioned on an end of the spring-biased protrusion 163 for rollingly engaging the depressions of the undulated surface 162. This provides a smoother feel to an operator when rotating the shift lever subassembly 156 than merely using a slide block, although slide blocks are contemplated to be within a scope of the present invention. This smooth feel can be very important to customer satisfaction, since any non-uniform friction not only gives the customer a poor opinion of the quality of the vehicle, but also it may be interpreted by a customer as a warranty problem.

Potentiometers are well known in industry and a detailed description herein is not believed to be necessary. The illustrated potentiometer 174 is a continuous output type potentiometer, but it is contemplated that different types can be used, and that sensors (e.g. Hall effect sensors) could be used if desired. The potentiometer 174 is connected to the vehicle control circuit 154 and permits a "shift-by-wire" arrangement that shifts the vehicle by electronic controls.

Figure 15:
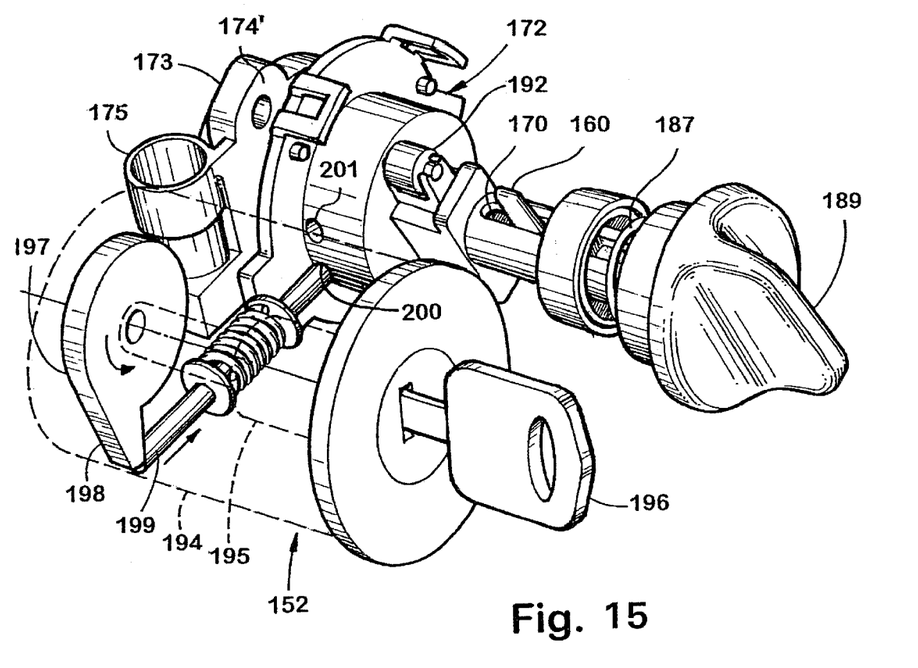
FIG. 15 is a another front perspective view of the shifter-and-ignition-switch assembly shown in FIG. 14, the housings of the shifter and of the ignition switch being removed to better show internal components.
Figure 16:
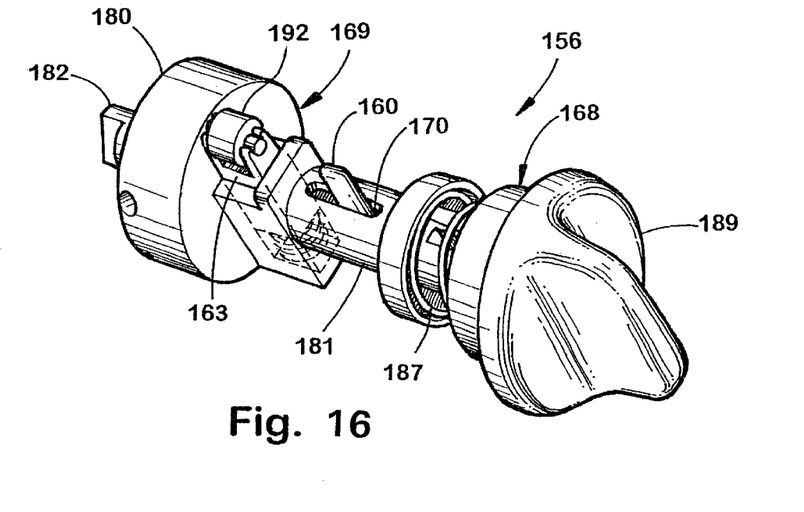
FIG. 16 is a perspective view of the shifter knob subassembly shown in FIG. 14.

The ignition switch 152 (FIG. 15) includes an ignition switch housing 194 attached to (or integrally molded as part of) the base 155. A lock tumbler 195 is positioned within the ignition switch housing 194 for operably receiving an ignition key 196. Vehicle ignition switches, lock tumblers, and keys for engaging the same are well known in the art. A cam 197 includes a radially extending finger 198 constructed to extend a spring-biased rod 199 when the ignition switch tumbler 195 is rotated to an "on" position. The rod 199 extends through the ignition switch housing 194 and into the shifter housing 171. The enlarged section 180 of the shift lever support 168 includes a hole 200 (and potentially a second hole 201) shaped to receive the end of the rod 199. The hole 200 corresponds to the park position P and prevents the ignition key 196 from being removed unless the shift lever subassembly 156 is in the park position P. The hole 201 corresponds to the neutral position N and prevents the ignition key 196 from being removed unless the shift lever subassembly 156 is in the neutral position N.

An electromechanical interlock device 153 (FIG. 14) is attached to the shifter 151. The interlock device 153 includes a housing 201', and an extendable rod 202 operably connected to a solenoid 203 held within the housing 201'. A rod 202 is located to extend into a hole in the shifter housing 171 and into a hole in the shift lever support 168. In the extended position, the rod 202 prevents the shift lever subassembly 156 from being rotated out of the park position P. It is contemplated that an electromagnetic coil or the like can be used in place of a solenoid if desired. The solenoid 203 is connected to the vehicle control circuit 154. The vehicle control circuit 154 is further connected to other vehicle sensors and switches, such as the illustrated switch 205 that closes when the brake pedal 206 is depressed. The vehicle control circuit 154 is programmed to extend the rod 202 until predetermined vehicle conditions are met. For example, the control circuit 154 can be programmed to extend the rod 202 until the brake pedal 206 is depressed and the brake switch 205 is closed. Thus, the vehicle shifter 151 cannot be shifted out of park position P until the vehicle operator depresses the brake pedal 206. This is a safety feature desired by manufacturers and required by the statutes of many countries. Notably, the present arrangement is very durable and secure, such that the shifter subassembly 156 cannot be forcibly rotated even though the present components are miniaturized.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A shifting system comprising:

an automatic transmission for a vehicle including gearing movable to a plurality of different gear positions and including an actuator rod operably coupled to the gearing and rotatable to selectively shift the gearing between the gear positions;

a driver interface module adapted to receive inputs from a vehicle driver for controlling the automotive transmission and to generate shifter position signals;

a control unit operably connected to the driver interface module and programmed to generate control signals in response to the shifter position signals to control shifting of the transmission; and a stepper motor unit mechanically attached to the actuator rod and electrically operably connected to the control unit, the stepper motor unit being configured to selectively rotate the actuator rod to shift the transmission in response to the control signals received from the control unit;

the driver interface module includes a shifter having a shift lever movable in a first manner to release the shift lever and movable in a second manner to various angular positions corresponding to the gear positions and further having a sensor arrangement for sensing the angular positions of the shift lever, the sensor arrangement being operably connected to the control unit and being configured to output the shifter position signals to the control unit.

2. The shifting system defined in claim 1, wherein the sensor arrangement includes a potentiometer.

3. The shifting system defined in claim 2, wherein the shift lever is elongated and configured to be operated while positioned between vehicle seats, and wherein the shift lever includes a base adapted for mounting to a floor pan of a vehicle.

4. The shifting system defined in claim 2, wherein the shifter comprises a miniaturized shifter and the shift lever comprises a knob shaped to be grasped and manipulated by a user's fingers.

5. The shifting system defined in claim 4, wherein the miniaturized shifter has a base shaped and adapted to be mounted in a confined space in an instrument panel of a vehicle.

6. The shifting system defined in claim 1, wherein the transmission includes a transmission casing adapted for shifting with a mechanical linkage, and that includes a mount for a transmission switch, and wherein the stepper motor unit includes flanges configured to mateably engage the mount for secure attachment.

7. The shifting system defined in claim 1, wherein the stepper motor unit includes a female connector adapted to matingly engage a male connector on the actuator rod in a direction in-line with a length of the actuator rod.

8. The shifting system defined in claim 1, wherein the stepper motor unit includes a housing bolted to a transmission casing of the transmission.

9. The shifting system defined in claim 1, wherein the stepper motor unit includes a stepper motor, and further includes a potentiometer sensing a rotation of a rotor on the stepper motor.

10. The shifting system defined in claim 1, wherein the control unit includes a programmable processor.

11. The shifting system defined in claim 1, including a vehicle condition sensor adapted to sense a predetermined vehicle condition and that is constructed to generate an output signal indicative of the predetermined vehicle condition, the vehicle condition sensor being operably connected to the control unit, the control unit being programmed to control shifting based on inputs from the vehicle condition sensor.

12. The shifting system defined in claim 1, wherein the stepper motor unit includes a stepper motor having components that generate a magnetic detent.

13. The shifting system defined in claim 1, wherein the control unit is adapted for connection to additional vehicle sensors and further is programmed to sense predetermined vehicle conditions, wherein the gear positions of the transmission include park, reverse, neutral, and drive gear positions, and wherein the driver interface module includes an interlock device that prevents movement of the shift lever from a region corresponding to the neutral and drive gear positions into a region corresponding to the reverse and park positions unless the predetermined vehicle conditions are met.

14. An electronic transmission shifting system adapted for shifting an existing automatic transmission for a vehicle, the existing automatic transmission including gearing movable to a plurality of different gear positions and including an actuator rod connected to the gearing and rotatable to selectively shift the gearing between the gear positions, where the actuator rod is adapted to engage a mechanical linkage, the shift system comprising:

a control unit programmed to generate signals to control shifting of the transmission;

a stepper motor unit with a connector configured for mechanical attachment to the actuator rod and electrically connected to the control unit, the stepper motor unit being configured to selectively rotate the actuator rod to shift the transmission in response to the signals received from the control unit; and a driver interface module including a shift lever movable in a first manner to release the shift lever and movable to different angular positions at which the driver interface module is constructed to generate outputs corresponding to the gear positions, the driver interface module being operably connected to the control unit.

15. The electronic transmission shifting system defined in claim 14, wherein the driver interface module includes a potentiometer.

* * * * *